United States Patent [19]
Guth

[11] 4,312,914
[45] Jan. 26, 1982

[54] PROCESS FOR COATING POROUS WEBS
[75] Inventor: Christian Guth, Basel, Switzerland
[73] Assignee: Ciba-Geigy Corporation, Ardsley, N.Y.
[21] Appl. No.: 133,159
[22] Filed: Mar. 24, 1980

Related U.S. Application Data

[63] Continuation of Ser. No. 836,640, Sep. 26, 1977, abandoned.

[30] Foreign Application Priority Data

Oct. 6, 1976 [CH] Switzerland .................. 12639/76

[51] Int. Cl.³ .................. B32B 27/00; B05D 3/02; B32B 23/08
[52] U.S. Cl. .................. 428/290; 260/29.6 TA; 427/381; 427/382; 427/386; 427/389; 427/389.9; 427/391; 427/392; 427/393.4; 428/510; 428/514
[58] Field of Search .................. 427/288, 386, 389.9, 427/381, 389, 391, 393.4; 428/290, 413, 510, 514, 526

[56] References Cited

U.S. PATENT DOCUMENTS

| 2,753,318 | 7/1956 | Maeder | 260/29.6 |
| 3,020,178 | 2/1962 | Sweeney et al. | 427/391 X |
| 3,081,193 | 3/1963 | Stasse | 427/208 X |
| 3,223,663 | 12/1965 | Altobelli et al. | 260/28.5 |
| 3,503,918 | 3/1970 | Le Sota et al. | 260/29.7 |
| 3,519,459 | 7/1970 | Hofmann et al. | 427/389.9 X |
| 3,537,883 | 11/1970 | Shaw et al. | 427/407.1 X |
| 3,732,184 | 5/1973 | Lindemann et al. | 260/77.5 BB |
| 3,825,431 | 7/1974 | Uhl et al. | 106/20 |

FOREIGN PATENT DOCUMENTS

| 980059 | 9/1970 | Fed. Rep. of Germany | 260/29.6 |
| 962459 | 7/1964 | United Kingdom | 260/29.4 UA |
| 1155531 | 6/1969 | United Kingdom | 427/246 X |
| 1185861 | 3/1970 | United Kingdom | 106/20 |

Primary Examiner—Michael R. Lusignan
Attorney, Agent, or Firm—Edward McC. Roberts

[57] ABSTRACT

The subject of the invention is a process for coating porous webs, wherein an aqueous, spreadable composition which has a pH value of 3 to 6 and contains at least (A) an emulsion copolymer comprising (a) an alkyl acrylate, (b) acrylonitrile, (c) an ethylenically unsaturated aliphatic carboxylic acid and/or the unsubstituted or methylated N-methylolamide of these carboxylic acids and (d) optionally another copolymerizable unsaturated compound which is free from acid groups, (B) an organic solvent which is insoluble to at most slightly soluble in water and has a boiling point between 50° and 160° C. and a molecular weight of 50 to 160, and (C), if desired, a polyfunctional crosslinking aminoplast precondensate or epoxide, is applied to the web, dried and then cured, the web also being impregnated if desired, either before or after coating, but prior to curing, with an agent for imparting hydrophobic and/or oleophobic properties, and dried. The coatings are stable to drycleaning.

13 Claims, No Drawings

PROCESS FOR COATING POROUS WEBS

This is a continuation of application Ser. No. 836,640 filed on Sept. 26, 1977, now abandoned.

The subject of the invention is a process for coating porous webs, wherein an aqueous, spreadable composition which has a pH value of 3 to 6 and contains at least (A) an emulsion copolymer comprising (a) 50 to 95 percent by weight of an alkyl acrylate having 3 to 8 carbon atoms in the alkyl radical, (b) 1 to 40 percent by weight of acrylonitrile, (c) 2 to 6 percent by weight of an ethylenically unsaturated aliphatic carboxylic acid having 3 or 4 carbon atoms and/or the unsubstituted or methylated N-methylolamide of these carboxylic acids and (d) 0 to 20 percent by weight of another copolymerisable unsaturated compound which is free from acid groups, (B) an organic solvent which is insoluble to at most slightly soluble in water and has a boiling point between 50° and 160° C. and a molecular weight of 50 to 160, selected from the categories of the alkyl alkanecarboxylates and the aliphatic or cycloaliphatic ketones, and the aliphatic hydrocarbons, which can be halogenated, and (C), if desired, a polyfunctional crosslinking aminoplast precondensate or epoxide, is applied to the web, dried and then cured at temperatures of 130° to 200° C., the web also being impregnated if desired, either before or after coating, but always prior to curing, with an agent for imparting hydrophobic and/or oleophobic properties, and dried.

Preferably, an ethylenically unsaturated aliphatic carboxylic acid having 3 or 4 carbon atoms or the unsubstituted or methylated N-methylolamide of such a carboxylic acid is used as the monomer (c) when preparing the component (A). In the case of component (B), the alkyl alkanecarboxylates and the ketones are preferred to the hydrocarbons.

Aqueous emulsions of thermoplastic polymers of the acrylic acid series and also their copolymers with other polymerisable unsaturated compounds are frequently used as coating agents or adhesives and are also used for the production of laminated products. The possibilities for industrial utilisation of such synthetic resin emulsions depend to a great extent on whether they meet the demands which have to be made on them, depending on the multiplicity of the possible applications which are envisaged. For example, when manufacturing coated textiles, such as materials for raincoats, oiled silk or synthetic leather, the demand is for the formation of resin films which adhere well and are as water-resistant as possible. Furthermore, for application to textiles or paper with a knife coating machine, the aqueous emulsions must be of an ointment-like, spreadable consistency. However, the acrylic resin emulsions, which are prepared in a known manner by polymerisation of the aqueous emulsion of the monomers, are usually obtained in the form of products of low viscosity, so that they have to be thickened for use for the abovementioned purposes, which entails the addition of thickeners, such as, for example, alkylcelluloses, polyvinyl alcohols, tragacanth, alginates or other water-soluble, highly viscous colloids. The addition of such thickeners usually effects a deterioration in the film properties, especially in the resistance of the film to water. Furthermore, relatively large amounts of pigments or fillers frequently have to be added to such synthetic resin emulsions for application, and a demand which must be made is, of course, that this should be possible without it resulting in coagulation or partial flocculation. A further demand is that such synthetic resin emulsions, which can be used for the purposes mentioned, should be as highly disperse as possible and have good stability during storage and application.

Furthermore, it is known that synthetic resin emulsions can be rendered spreadable by the addition of alkali and organic solvents of low volatility. However, formulations of this type frequently lead to inhomogeneous, blistered coatings which have thin areas, which are no longer so resistant to mechanical stress during drycleaning.

It has now been found that, according to the process of the invention, coatings are obtained which no longer have the disadvantages of the known coatings and, in particular, coatings are obtained which are stable to drycleaning and which retain the good properties of the known coatings. For example, the coating pastes have good flow characteristics on coating, and the coatings have a good resulting handle. In combinations with impregnating agents which impart hydrophobic properties, waterproof and water-repellent coatings are also obtained which are resistant to drycleaning in which so-called drycleaning detergents are also used.

The copolymers (=component A) to be used according to the invention are known, for example, from German Pat. No. 980,059 or from U.S. Pat. No. 3,732,184.

Preferred copolymers (A) are built up from 70 to 90, and especially 72 to 88, percent by weight of component (a), 5 to 25, and especially 8 to 22, percent by weight of component (b), 2 to 5 percent by weight of component (c) and 0 to 10, and especially 0 to 5, percent by weight of component (d).

Suitable alkyl acrylates having 3 to 8 carbon atoms in the alkyl radical are, for example, isopropyl acrylate, n-butyl acrylate, isobutyl acrylate, 2-ethylbutyl acrylate or 2-ethylhexyl acrylate.

Component (c) can be crotonic acid, vinylacetic acid, methacrylic acid or acrylic acid or the corresponding N-methylolamides or N-methoxymethylolamides. N-Methylolacrylamide and/or, in particular, acrylic acid, are of primary interest.

Possible unsaturated, polymerisable compounds which are free from acid groups and can, if desired, be admixed to the ternary system ester/nitrile/acid or ester/nitrile/N-methylolamide, and copolymerised, are not only those which are polymerisable on their own but also those which are not polymerisable on their own. Suitable compounds amongst those of the first group are polymerisable mono-unsaturated or poly-unsaturated compounds, especially those containing the atom grouping $CH_2=C>$, such as vinyl esters of organic acids, for example vinyl acetate, vinyl formate, vinyl butyrate or vinyl benzoate, and also vinyl alkyl ketones, vinyl halides, such as vinyl chloride or vinylidene chloride, and vinylaryl compounds, such as styrene and substituted styrenes, and also compounds of the acrylic acid series which differ from esters, nitriles or acids, for example acrylamide or methacrylamide and also analogous derivatives of α-chloroacrylic acid.

Examples which may be mentioned of the compounds which in themselves are not polymerisable are: maleates, fumarates or crotonates and also unsaturated hydrocarbons, such as camphene, and furthermore unsaturated ethers which are stable to acids, such as isobornyl allyl ether or diallyl ether.

The corresponding amides are preferably employed in combination with N-methylolamides since the N- methylolamides as a rule are prepared by partial methylolation of the corresponding amides, so that the amide and N-methylolamide are in a mixture. The methylol group can also always be in an etherified form, i.e. in the form of the methyl ether.

The copolymers to be used according to the invention are preferably prepared in the presence of emulsifiers. Possible emulsifiers, with the aid of which emulsions of the starting materials are prepared, are those which have adequate stability in an acid medium, for example acid fatty alcohol sulphuric acid esters, sulphonated castor oil, higher alkylsulphonates and higher oxyalkylsulphonates, especially sodium octadecaneoxysulphonate, preferably that which is free from other salts; sulphodicarboxylates, for example the sodium salt of dioctyl sulphosuccinate, higher alkylarylsulphonates, and also polyglycol ethers of higher-molecular fatty alcohols, such as cetyl alcohol, oleyl alcohol or octadecyl alcohol, for example the products resulting from the action of 15 to 30 mols of ethylene oxide on 1 mol of the fatty alcohol. Emulsifiers which have a pronounced wetting action, such as octylphenol polyglycol ether and its acid sulphuric acid esters, and also lauryl alcohol polyglycol ether, can also be used. It is also possible to use mixtures of such emulsifiers, as well as mixtures of such emulsifiers with protective colloids.

The conventional compounds which catalyse polymerisations, such as organic or inorganic peroxides or per-salts, for example peracetic acid, acetyl peroxide, benzoyl peroxide, benzoylacetyl peroxide, lauroyl peroxide, hydrogen peroxide, percarbonates, persulphates or perborates, can be added as the polymerisation catalysts under the action of which the polymerisation takes place.

Further details relating to the preparation of the copolymers can be taken from the patent specifications mentioned above.

Particularly suitable copolymers are obtained from the following monomers: (a) 82 to 88% by weight of n-butyl acrylate, (b) 8 to 12% by weight of acrylonitrile and (c) 4 to 6% by weight of acrylic acid; or (a) 72 to 78% by weight of n-butyl acrylate, (b) 16 to 22% by weight of acrylonitrile, (c) 2 to 3% by weight of N-methylolacrylamide and (d) 2 to 3% by weight of acrylamide.

The emulsion copolymers are in a partially neutralised form since, on the one hand, the copolymerisation can be carried out in the presence of small amounts (0.1 to 1%, relative to the monomer mixture) of an amine, for example an alkanolamine such as triethanolamine, and, on the other hand, the emulsion of the copolymer is partially neutralised by a base, for example ammonia. The pH value of the coating paste is preferably 4.5 and 5.5.

Organic solvents which are suitable as component (B) are, preferably, alkanecarboxylates having 1 to 4 carbon atoms in the acid part and 1 to 5 carbon atoms in the alcohol part, for example ethyl acetate, n-butyl acetate, amyl acetate, amyl formate, ethyl propionate, methyl propionate or methyl butyrate; or aliphatic ketones or dialkyl ketones having 4 to 6 carbon atoms, for example diethyl ketone, methyl n-propyl ketone or di-n-propyl ketone; or cycloaliphatic ketones having 5 or 6 ring carbon atoms, for example cyclopentanone or cyclohexanone; or aliphatic hydrocarbons having 6 to 12 carbon atoms, which can be halogenated, such as n-hexane, n-octane, benzine, cyclohexane, methylene chloride, trichloroethylene or tetrachloroethylene. Ethyl acetate is of primary interest.

The spreadable compositions can, and preferably do, also contain a polyfunctional, crosslinking aminoplast precondensate or epoxide.

In the present case, aminoplast precondensates are understood as meaning addition products of formaldehyde with nitrogen compounds which it is possible to methylolate. The following may be mentioned as nitrogen compounds which it is possible to methylolate: 1,3,5-aminotriazines such as N-substituted melamines, for example N-butylmelamine, N-trihalogenomethylmelamines, triazones and also guanamines, for example benzoguanamines, acetoguanamines or diguanamines.

Further compounds which can be used are: cyanamide, acrylamide, alkyl- or aryl-ureas and -thioureas and alkyleneureas or -diureas, for example ureas, thioureas, urones, ethyleneureas, propyleneureas, acetylenediurea or 4,5-dihydroxy-2-imidazolidone and derivatives thereof, for example 4,5-dihydroxy-2-imidazolidone substituted in the 4-position on the hydroxyl group by the radical —CH$_2$CH$_2$—CO—NH—CH$_2$—OH, and carbamates of lower alkanols, such as methyl carbamate, ethyl carbamate or hydroxyethyl carbamate. The methylol compounds of a urea, of an ethyleneurea or, especially, of melamine are preferably used. Valuable products are obtained, in general, from products which have as high as possible a degree of methylolation, but especially also from products with a low degree of methylolation, for example etherified or nonetherified methylolmelamines, such as di- or trimethylolmelamine, and their corresponding ethers. Suitable aminoplast precondensates are those predominantly monomolecular aminoplasts and also aminoplasts precondensed to a higher degree. Ethers of these aminoplast precondensates, such as the alkyl ethers having 1 to 4 carbon atoms in the alkyl part, for example the n-butyl ethers, isopropyl ethers, n-propyl ethers, ethyl ethers or, in particular, methyl ethers, can also be used.

Polyfunctional, crosslinking epoxides which can be used are epoxides which have at least two epoxide groups per molecule, which as a rule are liquid at room temperature and are preferably derived from a polyhydric phenol, for example bisphenol A, or from hydantoins, for example 5,5-dimethylhydantoin or from aliphatic diols, such as butane-1,4-diol, polypropylene glycol or polyethylene glycol, and epihalogenohydrins, for example epichlorohydrin.

Aminoplast precondensates based on dimethylolethyleneurea and methylolmelamines which are free or etherified by methanol especially tri- to hexa-methylolmelamine, are preferred as the so-called crosslinked component (C).

The coating pastes used according to the invention as a rule contain 15 to 30 percent by weight of component (A), 70 to 40 percent by weight of component (B), 0 to 5 percent by weight of component (C) and 15 to 30 percent by weight of water.

Component (C) is preferably present in amounts of 2 to 5 percent by weight. Preferred coating pastes contain 22 to 28 percent by weight of component (A), 56 to 44 percent by weight of component (B), 2 to 5 percent by weight of component (C) and 22 to 28 percent by weight of water.

Additions of, for example, aqueous organic pigment dispersions are tolerated well by the coating pastes, i.e. the lowering in the viscosity effected by the addition of the aqueous dispersion can be largely compensated by adding somewhat more solvent (component B).

If desired, the coating pastes can also contain fillers, for example water-insoluble inorganic salts, such as barium sulphate, as further additives.

The aqueous, spreadable coating compositions can be applied to the webs in a conventional manner. According to the invention, elastic coatings which adhere well can be produced on woven fabrics, knitted fabrics or non-wovens of all types or on paper and leather in this way. Coatings on textile webs of natural or synthetic fibres, such as cellulose, for example cotton, jute or hemp; wool, rayon, silk, rayon staple, synthetic polyamide, polyester or polyacrylonitrile, are of primary interest. Particularly advantageous coatings are obtained on fabrics made of synthetic polyamide.

As a rule, the coating composition is applied with the aid of a coating machine, preferably with a knife. After the webs have been coated, they are dried at temperatures of up to 130° C., i.e. at between room temperature and 130° C.

The coatings are cured at 130° to 200° C., and preferably at 160° to 200° C.

The webs, and especially the textile webs, can also be rendered hydrophobic and/or oleophobic before or after coating of the webs, but always before curing, and this is effected by impregnating the webs with the corresponding agents and subsequently drying. Suitable agents for this purpose are, for example, aqueous silicone oil emulsions, organic solutions of organopolysiloxanes, fat-modified melamine resins, fluochemicals or water-soluble chromium complexes of stearic acid. Coatings of this type exhibit good stability in drycleaning, and this can easily be shown by the water column test, which is a measure of the impermeability to water. Even when there is a certain loss in the impermeability to water, the hydrophobic effect is retained in the case of webs additionally impregnated with agents for imparting hydrophobic properties.

In the preparation instructions and examples which follow, parts and percentages are parts by weight and percentages by weight.

PREPARATION INSTRUCTIONS

Copolymer A

A monomer mixture consisting of 84% of n-butyl acrylate, 11% of acrylonitrile and 5% of acrylic acid is copolymerised in aqueous emulsion by a known method, in the presence of sodium 2-oxyoctadecanesulphonate as the emulsifier and of potassium persulphate as the catalyst. A milky white emulsion which has a pH value of 5.0 and a solids content of 50% is obtained.

Copolymer B

A monomer mixture consisting of 76% of n-butyl acrylate, 19% of acrylonitrile, 2.5% of N-methylolacrylamide and 2.5% of acrylamide is copolymerised in aqueous emulsion by a known method, in the presence of an adduct of 1 mol of octylphenol and 40 mols of ethylene oxide as the emulsifier, of potassium persulphate as the catalyst and of a small amount of itaconic acid. A milky white emulsion which has a pH value of 5.0 and a solids content of 50% is obtained.

Copolymer C

A solution of 1.6 parts of sodium octadecaneoxysulphonate in 62 parts of distilled water is treated with 0.2 part of triethanolamine, 0.1 part of isooctyl alcohol and 2.65 parts of 100% strength acrylic acid.

A mixture of 39.6 parts of 2-ethylbutyl acrylate and 13.2 parts of acrylonitrile is allowed to flow slowly into this mixture, at 20° to 25° C., while stirring vigorously, and by this means an emulsion is formed. Half of this emulsion is warmed to 65° C., while stirring and under nitrogen, and this is then treated rapidly with a solution of 0.1 part of potassium persulphate in one part of distilled water. After the polymerisation has started, the other half of the emulsion, into which a solution of 0.1 part of potassium persulphate in 1 part of water has also previously been mixed, is allowed to flow in over a period of 1 hour.

After all of the monomer emulsion has flowed in, the mixture is heated slowly to 80° to 85° C. and polymerised for a further 2¾ hours. A very finely divided, stable, coagulate-free emulsion which has a solids content of 50 to 51% is obtained.

Copolymer D

In the manner described in Instruction C, 50.16 parts of isopropyl acrylate and 2.64 parts of acrylonitrile are emulsified in a solution of 1.6 parts of sodium octadecaneoxysulphonate in 77 parts of water, to which 2.65 parts of acrylic acid, 0.2 part of triethanolamine and 0.1 part of isooctyl alcohol have been added.

Half of this emulsion is treated with 3.2 parts of carbon tetrachloride and the mixture is warmed to 55° C., while stirring and under nitrogen, for polymerisation. Polymerisation starts on the addition of 1 part of a 10% strength aqueous solution of potassium persulphate, and after the temperature has risen to 65° C. the other half of the above emulsion, which has also been mixed with 1 part of 10% strength potassium persulphate solution, is allowed to flow in over a period of 35 to 40 minutes and the resulting mixture is then stirred for a further 1½ to 2 hours while gradually warming to 75° to 85° C. A pure, stable, very finely divided emulsion forms, which has a polymer content of 40 to 41%.

Copolymer E

The procedure is as described in Instruction C but 44.88 parts instead of 50.16 parts of isopropyl acrylate, 7.92 parts instead of 2.64 parts of acrylonitrile and 72 parts instead of 77 parts of water are used. A pure, stable, finely divided emulsion which has a 43% solids content is obtained.

Copolymer F

Using 42.24 parts of isopropyl acrylate, 10.56 parts of acrylonitrile and 65.5 parts of water in place of the amounts of these compounds indicated in Instruction D, and retaining the amounts indicated in those instructions for the other reactants, an analogous procedure gives a pure, stable, finely divided emulsion which has a solids content of 45%.

Copolymer G

In the manner described in Instruction C, 31.68 parts of 2-ethylhexyl acrylate and 21.12 parts of acrylonitrile are emulsified in a solution of 1.6 parts of sodium octadecaneoxysulphonate in 55 parts of distilled water, to which, in addition, 2.65 parts of 100% strength acrylic acid, 0.2 part of triethanolamine and 0.1 part of isooctanol have also been added. The polymerisation takes place analogously to the manner described in Instruction C. The resulting very finely divided emulsion is virtually pure and stable and has a solids content of 50 to 51%.

Copolymer H

In the manner described in Instruction C, 42.24 parts of isobutyl acrylate, 5.28 parts of acrylonitrile and 5.28 parts of benzyl acrylate are emulsified in a mixture of 1.6 parts of sodium octadecaneoxysulphonate, 0.2 part of triethanolamine, 0.1 part of isooctanol, 2.65 parts of acrylic acid and 55 parts of water.

This gives a very fine, stable emulsion which has a solids content of 50 to 51%.

In the above example, benzyl acrylate can be replaced by tetrahydrofuryl acrylate, whilst retaining the other constituents.

Copolymer I

In the manner described in Instruction C, a mixture of 47.52 parts of isopropyl acrylate, 2.64 parts of acrylonitrile and 2.64 parts of acrylamide are emulsified in a mixture of 65.5 parts of distilled water, 1.6 parts of sodium octadecaneoxysulphonate, 2.65 parts of acrylic acid, 0.2 part of triethanolamine and 0.1 part of isooctyl alcohol. Half of this emulsion is warmed to 55° C. under nitrogen and while stirring and 1 part of a 10% strength aqueous solution of potassium persulphate is added. After polymerisation has started and the temperature has risen to 56° to 58° C., the other half of the monomer emulsion, which has been mixed with 1 part of 10% strength potassium persulphate solution, is allowed to flow in over a period of 1 hour. After all of the emulsion has flowed in, polymerisation is continued for a further 3 to 3½ hours at a temperature of 80° to 83° C.

A stable, finely divided, virtually pure synthetic resin emulsion which is of low viscosity and has a 45% solids content is obtained.

Copolymer J

If the procedure according to Instruction I is followed using an equal amount of isobutyl acrylate in place of isopropyl acrylate, in which case, in addition, only 55 parts instead of 65.5 parts of water are used, a pure, finely divided, stable emulsion which has a solids content of 50 to 51% is obtained.

Copolymer K

In the manner described in Instruction C, a mixture of 44.88 parts of isobutyl acrylate, 7.92 parts of acrylonitrile and 2.64 parts of camphene is emulsified in 58 parts of water, to which 1.6 parts of sodium octadecaneoxysulphonate, 0.2 part of triethanolamine, 2.65 parts of acrylic acid and 0.1 part of isooctanol have been added. The start of polymerisation in this emulsion, half of which is initially introduced, is achieved after warming to 63° to 65° C., under nitrogen and while stirring, by the addition of 1 part of 10% strength potassium persulphate solution, and the other half of the emulsion is then allowed to flow in over a period of 2 hours, at 70° C. After all of the emulsion has flowed in, a solution of 0.1 part of benzoyl peroxide in 0.8 part of benzene is added rapidly, and the mixture is polymerised for a further 4 hours at 80° to 85° C. After customary blowing out of the completely polymerised emulsion with nitrogen, the emulsion is cooled to room temperature.

The pure, finely divided emulsion of the copolymer is stable and has a solids content of about 50%.

Copolymer L

In the manner described in Instruction C, 51.75 parts of isopropyl acrylate, 0.52 part of allyl acrylate and 0.52 part of acrylonitrile are emulsified in a solution of 1.6 parts of sodium octadecaneoxysulphonate in 60 parts of distilled water, to which 2.65 parts of acrylic acid, 0.2 part of triethanolamine and 0.1 part of isooctanol have been added. For polymerisation, half of the emulsion is warmed to 57° to 58° C., in a nitrogen atmosphere and while stirring, and treated with 1 part of a 10% strength aqueous solution of potassium persulphate. After the temperature has risen to 64° C., the other half of the emulsion, which has been mixed with 1 part of a 10% strength aqueous solution of potassium persulphate, is allowed to run in over a period of 1 hour, and the mixture is then further polymerised for 3 hours at 83° to 85° C.

The finely divided emulsion, which is of low viscosity, is stable and has a solids content of 48 to 50%.

Copolymer M

In accordance with Instruction C, 42.24 parts of isopropyl acrylate, 5.28 parts of isobornyl allyl ether and 5.28 parts of acrylonitrile are emulsified in a solution of 1.6 parts of sodium octadecaneoxysulphonate in 75 parts of distilled water, to which 2.65 parts of acrylic acid, 0.2 part of triethanolamine and 0.1 part of isooctanol have been added. Polymerisation is effected in the manner described in Instruction C but, after all of the emulsified monomer has flowed in, polymerisation is brought to completion over a period of 3½ hours at 85° to 88° C.

The resulting emulsion is of low viscosity, finely divided, pure and stable.

Copolymer N

In the manner described in Instruction C, 46.93 parts of isopropyl acrylate and 5.87 parts of acrylonitrile are emulsified in a solution of 1.6 parts of sodium octadecaneoxysulphonate in 75 parts of water, to which 2.65 parts of methacrylic acid, 0.2 part of triethanolamine and 0.1 part of isooctanol have been added. For polymerisation, half of the emulsion is warmed to 65° to 68° C., in a nitrogen atmosphere and while stirring, and treated with 0.5 part of a 10% strength aqueous solution of potassium persulphate. After the temperature has risen to 75° C., the other half of the emulsion, which has been mixed with 1.5 parts of a 10% strength aqueous solution of potassium persulphate, is allowed to flow in over a period of 1 hour, and the mixture is then further polymerised for 3 hours at 81° to 85° C. The finely divided emulsion, which is of low viscosity, is stable and has a solids content of 46 to 47%.

Copolymer O

A monomer mixture of 80% of n-butyl acrylate, 10% of acrylonitrile and 10% of acrylic acid is copolymerised in the same manner as described in Instruction A. This gives an emulsion which has a pH value of 5.0 and a solids content of 50%.

Copolymer P

A monomer mixture of 85% of isobutyl acrylate, 10% of acrylonitrile and 5% of acrylic acid is copolymerised in the same manner as described in Instruction A. This given an emulsion which has a pH value of 5.0 and a solids content of 50%.

Coating pastes

The following coating pastes are prepared by adding the components together and subsequently stirring the mixture for 3 minutes at 5,000 revolutions/minute:

A: 1,000 g of copolymer A, 50 g of a 50% strength aqueous solution containing 35% of dimethylolethyleneurea and 15% of methylated hexamethylolmelamine and 1,000 g of ethyl acetate.

B: 1,000 g of copolymer A and 1,000 g of ethyl acetate.

C: 1,000 g of copolymer A, 100 g of 1,4-butanediol diglycidyl ether and 1,000 g of ethyl acetate.

D: 1,000 g of copolymer A, 100 g of the diglycidyl ether of a polyethylene glycol having a molecular weight of 300 and 1,000 g of ethyl acetate.

E: 1,000 g of copolymer A, 100 g of γ-glycidyl-oxypropyltrimethoxy-silane and 1,000 g of ethyl acetate.

F: 1,000 g of copolymer A, 50 g of a 50% strength aqueous solution containing 35% of dimethylolethyleneurea and 15% of methylated hexamethylolmelamine, 100 g of barium sulphate and 1,000 g of ethyl acetate.

G: 1,000 g of copolymer A, 100 g of N,N'-diglycidyl-5,5-dimethyl-hydantoin and 1,000 g of ethyl acetate.

H: 1,000 g of copolymer A, 100 g of 1,3-bis-(1-glycidyl-5,5-dimethyl-3-hydantoinyl)-propanol 2-glycidyl ether and 1,000 g of ethyl acetate.

I: 1,000 g of copolymer A, 50 g of a 50% strength aqueous solution containing 35% of dimethylolethyleneurea and 15% of methylated hexamethylolmelamine and 1,000 g of ethyl acetate.

J: 1,000 g of copolymer A, 35 g of a 75% strength aqueous solution of dihydroxydimethylolethyleneurea, 30 g of a 22.5% strength solution of an oleyl alcohol/ethylene oxide adduct crosslinked with hexamethylene diisocyanate, in tert.-butanol, 100 g of a blue organic pigment and 500 g of ethyl acetate.

K: 1,000 g of copolymer B, 35 g of a 75% strength aqueous solution of dihydroxydimethylolethyleneurea, 250 g of ethyl acetate, 30 g of a 22.5% strength solution of an oleyl alcohol/ethylene oxide adduct, crosslinked with hexamethylene diisocyanate, in tert.-butanol and 50 g of an orange organic pigment.

L: 1,000 g of copolymer O, 50 g of a 50% strength aqueous solution containing 35% of dimethylolethyleneurea and 15% of methylated hexamethylolmelamine and 1,000 g of ethyl acetate.

M: 1,000 g of copolymer P, 50 g of a 50% strength aqueous solution containing 35% of dimethylolethyleneurea and 15% of methylated hexamethylolmelamine and 1,000 of ethyl acetate.

In place of copolymers A and B, it is also possible to employ copolymers C to P in the coating pastes A to K, coating pastes having similar properties being obtained.

EXAMPLE 1

A polyamide fabric is coated with the coating compositions by providing the fabric with 2 coats, in a floating knife coating machine, with intermediate drying at 120° C.

The coated fabric is then impregnated with a perchloroethylene liquor containing 50 g/l of a mixture of 30 parts of a polydimethylsiloxane and 30 parts of a H-polysiloxane in 40 parts of perchloroethylene, and 20 g/l of a 15% strength solution of Zr n-propionate in perchloroethylene/butyldiglycol. The liquor pick-up is 40%. Subsequently, the coating is dried at 80° to 90° C. and then cured for 30 seconds at 180° C.

This gives uniform, waterproof coatings which have a good stability to drycleaning and especially also to drycleaning liquors which contain a drycleaning detergent.

The impermeability to water is tested by the water column test according to SNV 198,571 and specifically is tested after curing and after drycleaning 3 times for 10 minutes using a liquor ratio of 1:15 in a liquor containing, per liter of perchloroethylene: 2.5 g of a drycleaning detergent based on mineral oil sulphonates, alkylphenol polyglycol ethers and dodecylbenzenesulphonates, and 5 g of water.

At the same time, the fabrics are tested in respect to abrasion. For this purpose, the fabric samples are folded once with the coated side outwards, and the fold is fixed by sewing, prior to drycleaning. With this test the fold is assessed visually.

TABLE I

Grading scale:
severe \
distinct  \
slight     } abrasion
trace     /
no       /

| Coating composition | Water column in mm after coating | after 3 × 10' drycleaning | Abrasion |
|---|---|---|---|
| A | 1,000 | 500 | trace |
| B | 1,000 | 500 | slight |
| C | 1,000 | 180 | slight |
| D | 1,000 | 200 | slight |
| E | 1,000 | 110 | slight |
| F | 1,000 | 1,000 | slight |
| G | 1,000 | 350 | trace |
| H | 1,000 | 380 | trace |
| I | 1,000 | 300 | slight |
| A | 900 | 110 | trace* |
| B | 900 | 120 | slight* |
| L | 1,000 | 450 | trace |
| M | 1,000 | 1,000 | slight |

*The samples for these two tests were not impregnated with an agent for imparting hydrophobic properties.

EXAMPLE 2

Example 1 is repeated with coating paste A. In parallel to this, however, coatings are produced in which the ratio of copolymer A to ethyl acetate in the coating paste is varied by mixing 10 parts of copolymer A with an increasing amount of ethyl acetate.

A-1: 6 parts of ethyl acetate
A-2: 8 parts of ethyl acetate
A-3: 12 parts of ethyl acetate
A-4: 15 parts of ethyl acetate
A-5: 20 parts of ethyl acetate Coating pastes A-1 to A-5 are all spreadable and give results similar to those indicated for paste A in Example 1.

EXAMPLE 3

A polyamide fabric is coated with coating paste A in the same way as indicated in Example 1. At the same time, a second fabric sample is coated with the following known coating paste: 1,000 g of copolymer A, 30 g of 30% strength sodium hydroxide solution, 50 g of a 50% strength aqueous solution containing 35% of dimethylolethyleneurea and 15% of methylated hexamethylolmelamine and 1,000 g of a mixture of aliphatic hydrocarbons having a boiling range of 140° to 190° C.; subsequently, impregnating and curing are carried out in the same way as indicated in Example 1.

The contact angles of water drops on the coated and impregnated fabric are now determined as a measure of the surface tension and thus of the wettability of the coatings. The angle is measured externally, so that a small angle signifies no wetting to slight wetting and a large angle signifies extensive wetting to complete wetting, i.e. angles of less than 90° signify a hydrophobic finish and angles greater than 90° signify a wettable finish.

The contact angles are measured after coating and after drycleaning 3 times for 10 minutes as indicated in Example 1.

TABLE II

| Measurement of the contact angle | Known coating | Coating according to the invention |
|---|---|---|
| Before drycleaning | 70° | 77° |
| After drycleaning | 115° | 69° |

In order to determine the resistance of the coatings to rubbing, the coated fabric is abraded, with the coated side facing upwards, in the dry and the wet state, in an abrasion apparatus using a brush. The speed (revolutions/minute) at which damage to the layer can be ascertained is determined.

| Resistance to rubbing (speed) | Known coating | Coating according to the invention |
|---|---|---|
| Dry | 25 | 400 |
| Wet | 5 | 1,000 |

EXAMPLE 4

A polyamide fabric weighing 120 g/m$^2$ is coated on both sides, with 1 coat each side, using coating paste J in a floating knife coating machine, with intermediate drying at 150° C.

The weight of the dry layer is 20 g/m$^2$ per side. The coated fabric is impregnated with a perchloroethylene liquor containing: 50 g/l of a 10% strength solution of dimethylpolysiloxane and H-polysiloxane in tetrachloroethylene and 20 g/l of a 15% strength solution of zirconium n-propylate in perchloroethylene and butyl diglycol, the liquor pick-up being 35%.

Subsequently, the layer is dried at 120° C. and then cured for 30 seconds at 180° C.

A uniform deep blue coating is obtained and the material has good impermeability to water. The resistance of the coating to folding is still flawless after folding 100,000 times.

The fastness of the dyeing to rubbing is grade 4 when dry and grade 3-4 when wet, assessed on the AATCC grey scale. (Grades 1 to 5, 5 being the best grade).

EXAMPLE 5

A cotton tent fabric is coated on both sides, with 1 coat per side, using coating paste K in a floating knife coating machine, with intermediate drying at 150° C. The weight of the dry layer is 25 g/m$^2$ per side. The coated fabric is impregnated with an aqueous formulation of the following composition: 30 g/l of a 60% strength aqueous solution of pentamethylolmelamine dimethyl ether; 30 g/l of a 20% strength emulsion of an agent for imparting oleophobic properties which is based on copolymers of acrylates of N-alkyl-N-hydroxyalkylperfluorooctylsulphonamide according to U.S. Pat. No. 2,803,615; 40 g/l of a 26% strength aqeuous cationic emulsion of a hexamethylolmelamine pentamethyl ether/stearic acid methylolamide-n-propyl ether condensation product; 40 g/l of a fungicide based on a pentachlorophenol ester; 5 ml/l of a 50% strength solution of Zn(NO$_3$)$_2$ in water and 1 ml/l of 40% strength acetic acid.

The liquor pick-up is 45% and the coating is dried at 120° C. and cured for 90 seconds at 170° C.

A deep orange coloured coating which covers well and has good fastness to rubbing is obtained. The impermeability to water is equivalent to a water column of 300 mm and this rises to 400 mm after washing for 24 hours with cold running water. The fabric is also oil-repellent and protected against mould attack.

EXAMPLE 6

A polyamide fabric weighing 70 g/m$^2$ is coated, with 2 coats, using the coating pastes of the following composition, on a floating knife coating machine, with intermediate drying at 120° C. The weight of the dry layer is about 15 g/m$^2$. Coating paste: 1,000 g of copolymer A, 1,000 g of ethyl acetate and 25 g of component C.

The following are employed as component C:
6.1: a 60% strength aqueous solution of a pentamethylolmelamine dimethyl ether
6.2: 100% hexamethylolmelamine hexamethyl ether
6.3: a 42% strength aqueous solution of dihydroxydimethylolethyleneurea
6.4: dimethylolethyleneurea
6.5: a 45% strength aqueous solution of dimethylolurea.

Subsequently, the coated fabric is impregnated with a perchloroethylene liquor containing: 50 g/l of a 60% strength solution of dimethylpolysiloxane and H-siloxane in perchloroethylene and 20 g/l of a 15% strength solution of zirconium n-propylate in perchloroethylene and butyl diglycol, the liquor pick-up being 40%. The coating is then dried at 80°-90° C. and cured for 30 seconds at 180° C. Uniform, waterproof coatings with good stability to drycleaning are obtained.

Testing of the impermeability to water in accordance with SNV 198,571 gives the following results:

| Paste containing component C | Water column in mm | |
|---|---|---|
| | After coating | After 3 × 10' drycleaning |
| 6.1 | 1,000 | 800 |
| 6.2 | 1,000 | 700 |
| 6.3 | 1,000 | 700 |
| 6.4 | 1,000 | 450 |
| 6.5 | 1,000 | 600 |

EXAMPLE 7

A polyamide fabric is coated with coating composition A, and subsequently rendered hydrophobic, as described in Example 1, but a number of different solvents are used in the coating paste. The test results are summarised in the table which follows.

| | | Water column in mm | | |
|---|---|---|---|---|
| No. | Solvent | after coating | after 3 × 10' drycleaning | Abrasion |
| 7.1 | Ethyl acetate | 1,000 | 1,000 | trace |
| 7.2 | n-Butyl acetate | 1,000 | 1,000 | some |

-continued

| No. | Solvent | Water column in mm after coating | after 3 × 10' drycleaning | Abrasion |
|---|---|---|---|---|
| 7.3 | Diethyl ketone | 1,000 | 280 | some |
| 7.4 | Cyclohexanone | 1,000 | 1,000 | some |
| 7.5 | n-Hexane | 1,000 | 140 | some |
| 7.6 | Cyclohexane | 1,000 | 750 | trace |
| 7.7 | Methylene chloride | 1,000 | 1,000 | trace |
| 7.8 | Trichloroethylene | 1,000 | 1,000 | some |
| 7.9 | Perchloroethylene | 1,000 | 700 | some |

What is claimed is:

1. A process for coating a porous web, which comprises the steps of applying to the web an aqueous, spreadable composition which contains no thickening agent, which has a pH value of 3 to 6 and which includes 15 to 30% by weight of (A) an emulsion copolymer comprising (a) 50 to 95 percent by weight of an alkyl acrylate having 3 to 8 carbon atoms in the alkyl radical, (b) 1 to 40 percent by weight of acrylonitrile, (c) 2 to 6 percent by weight of an ethylenically unsaturated aliphatic carboxylic acid having 3 or 4 carbon atoms and/or the unsubstituted or methylated N-methylolamide thereof and (d) 0 to 20 percent by weight of another copolymerisable unsaturated compound which is free from acid groups, and 40 to 70% by weight of (B) an oragnic solvent which is substantially insoluble to at most slightly soluble in water, which has a boiling point between 50° and 160° C. and a molecular weight of 50 to 160, and which is selected from the group consisting of alkyl alkanecarboxylates, aliphatic ketones, cycloaliphatic ketones, aliphatic hydrocarbons, and halogenated aliphatic hydrocarbons, drying and then curing at temperatures of 100° to 200° C.

2. A process according to claim 1, which comprises applying to the web an aqueous, spreadable composition which has a pH value of 3 to 6 and contains at least (A) an emulsion copolymer comprising (a) 50 to 95 percent by weight of an alkyl acrylate having 3 to 8 carbon atoms in the alkyl radical, (b) 1 to 40 percent by weight of acrylonitrile, (c) 2 to 6 percent by weight of an ethylenically unsaturated aliphatic carboxylic acid having 3 or 4 carbon atoms, or the unsaturated or methylated N-methylolamide of these carboxylic acids, and (d) 0 to 20 percent by weight of another copolymerisable unsaturated compound which is free from acid groups, (B) an organic solvent which is insoluble to at most slightly soluble in water and has a boiling point between 50° and 160° C. and a molecular weight of 50 to 160, selected from the categories of the alkyl alkanecarboxylates and the aliphatic or cycloaliphatic ketones, drying and then curing at temperatures of 100° to 200° C.

3. A process according to claim 1, which comprises using a component (A) that has been prepared from 70 to 90 percent by weight of component (a), 5 to 25 percent by weight of component (b), 2 to 5 percent by weight of component (c) and 0 to 10 percent by weight of component (d).

4. A process according to claim 1, which comprises using acrylic acid or N-methylolacrylamide as component (b) in the preparation of component (A).

5. A process according to claim 1, which comprises using a component (A) that has been prepared from (a) 82 to 88 percent by weight of n-butyl acrylate, (b) 8 to 12 percent by weight of acrylonitrile and (c) 4 to 6 percent by weight of acrylic acid, or from (a) 72 to 88 percent by weight of n-butyl acrylate, (b) 16 to 22 percent by weight of acrylonitrile, (c) 2 to b 3 percent by weight of N-methylolacrylamide and (d) 2 to 3 percent by weight of acrylamide.

6. A process according to claim 1, which comprises using alkyl alkanecarboxylates having 1 to 4 carbon atoms in the acid part and 1 to 5 carbon atoms in the alcohol part, dialkyl ketones having 4 to 6 carbon atoms or cycloaliphatic ketones having 5 or 6 ring carbon atoms as component (B).

7. A process according to claim 6, which comprises using ethyl acetate as component (B).

8. A process according to claim 1, which comprises also impregnating the web either before or after the coating but before the curing with an agent for imparting hydrophobic and/or oleophobic properties, and drying.

9. A process according to claim 1, wherein the aqueous, spreadable composition further contains 0 to 5 percent by weight of component (C), a polyfunctional crosslinking aminoplast precondensate or epoxide.

10. A process according to claim 1, in which the aqueous composition also contains a filler.

11. A porous web coated according to claim 1.

12. An aqueous, spreadable composition which contains no thickening agent, which has a pH value of 3 to 6 and which includes 15 to 30% by weight of (A) an emulsion copolymer comprising (a) 50 to 95 percent by weight of an alkyl acrylate having 3 to 8 carbon atoms in the alkyl radical, (b) 1 to 40 percent by weight of acrylonitrile, (c) 2 to 6 percent by weight of an ethylenically unsaturated aliphatic carboxylic acid having 3 or 4 carbon atoms and/or the unsubstituted or methylated N-methylolamide thereof and (d) 0 to 20 percent by weight of another copolymerisable unsaturated compound which is free from acid groups, and 40 to 70% by weight of (B) an organic solvent which is substantially insoluble in water, which has a boiling point between 50° and 160° C. and a molecular weight of 50 to 160, and which is selected from the group consisting of alkyl alkanecarboxylates, aliphatic ketones, cycloaliphatic ketones, aliphatic hydrocarbons, and halogenated aliphatic hydrocarbons.

13. The composition of claim 12, further comprising a polyfunctional crosslinking aminoplast precondensate or epoxide.

* * * * *